United States Patent [19]
Hilsum

[11] Patent Number: 4,525,032
[45] Date of Patent: Jun. 25, 1985

[54] LIQUID CRYSTAL REUSABLE SIGNATURE COMPARISON

[75] Inventor: Cyril Hilsum, Malvern, England

[73] Assignee: The Secretary of State for Defence in Her Britannic Majesty's Government of the United Kingdom of Great Britain and Northern Ireland, London, England

[21] Appl. No.: 385,263

[22] Filed: Jul. 27, 1982

[51] Int. Cl.³ .................. G02F 1/137; G02F 1/133
[52] U.S. Cl. .................. 350/331 R; 350/330; 350/346; 350/350 S; 350/351
[58] Field of Search .............. 350/331 R, 346, 350 S, 350/351, 330

[56] References Cited

U.S. PATENT DOCUMENTS

| | | |
|---|---|---|
| 3,111,646 | 11/1963 | Harmon . |
| 3,133,266 | 5/1964 | Frishkopf . |
| 3,642,348 | 2/1972 | Wysocki et al. .................. 350/346 |
| 3,647,279 | 3/1972 | Sharpless et al. .................. 350/330 |
| 3,684,828 | 8/1972 | Maher . |
| 3,697,687 | 10/1972 | Larson et al. . |
| 3,790,709 | 2/1974 | Heywang . |
| 4,024,500 | 5/1977 | Herbst et al. . |
| 4,317,005 | 2/1982 | de Bruyne . |
| 4,318,096 | 3/1982 | Thornburg et al. . |
| 4,345,239 | 8/1982 | Elliott . |
| 4,396,997 | 8/1983 | Kahn et al. .................. 350/351 X |
| 4,405,921 | 9/1983 | Mukaiyama .................. 340/784 X |
| 4,418,242 | 11/1983 | Kouno . |

Primary Examiner—John K. Corbin
Assistant Examiner—David Lewis
Attorney, Agent, or Firm—Cushman, Darby & Cushman

[57] ABSTRACT

A liquid crystal display comprises a layer of cholesteric or smectic liquid crystal material contained between a front and rear wall. A pen having a tip is caused to move across the front wall causing an observable change in the liquid crystal under the pen tip. The change in liquid crystal material may be between its grandjean or planar state and focal conic state. This change may be caused by local pen tip pressure, heat, light or electric field. Erasure of observed information is by flexing of the liquid crystal layer. Alternatively heating and cooling, or an electric field may be used to erase the information. A resistive layer covers the front wall so that the instantaneous position of the pen can be fed through bus bars to a computer. This computer compares the electrical version of an observed signature on the display with a stored signature.

31 Claims, 5 Drawing Figures

LIQUID CRYSTAL REUSABLE SIGNATURE COMPARISON

This invention relates to liquid crystal displays.

Liquid crystal displays typically comprise a layer of liquid crystal material contained between two glass walls. Information is displayed by altering the molecular alignment of selected parts of the layer. For example the alignment may be changed electrically by electrodes on the walls and numerics displayed as in a digital watch. Molecular alignment may also be changed by temperature and this is used in thermometers. For example a bar thermometer has a number of different cholesteric materials along a strip each displaying a temperature value only when its temperature equals that value. Liquid crystal material can show a memory effect; that is the molecules can be changed from a first state to a second state and will remain in that second state for a period of time dependent on the material used, e.g. may be minutes or even hours.

Cholesteric liquid crystal materials can adopt a grandjean (or planar) state or a focal conic state below the isotropic liquid state.

The grandjean or planar state are synonymous terms for the particular state of the chiral liquid crystal material in its liquid crystal mesophase in which the axes of twist in the molecular helical arrangements are essentially aligned parallel to one another and perpendicular to the plane of a layer of material in a cell.

The focal conic state is the state of a chiral liquid crystal material in its liquid crystal mesophase in which the axes of twist in the molecular helical arrangements are essentially random (the molecules being packed into randomly orientated focal conic domains).

The term clearing point means the temperature at which a liquid crystal material is converted from a liquid crystal state to an isotropic liquid state. The isotropic state exists at a higher temperature than the liquid crystal state.

One useful permanent display is a person's signature written on a card, etc. In some banking transactions money is obtained on production of a signed card plus a witnessed signature. A modification is a computer based system plus a writing pad consisting of two flexible resistive sheets. Local pressure with a pen brings the sheets into local contact giving rise to electrical signals indicating the position of the pressure point. The variation in electrical signals during writing of a signature are compared with information stores e.g. on a credit card itself. Money is only obtainable on a suitable matching of the signature and stored information. One problem with this system is that a visual vertification of the written signature is not available at the writing pad. To be re-usable many times it is desirable that no permanent marking of the flexible sheets occurs on writing.

An object of this invention is to provide a liquid crystal display giving a semi-permanent record of the path traced by a stylus on the display. The display may be used in conjunction with a computer based signature verification system or alone as a re-usable writing pad.

According to this invention a liquid crystal comprisea a layer of a liquid crystal material contained between front and rear walls and a pen having a tip for contacting the front wall and changing the state of selected areas of the layer at positions adjacent the pen tip to provide observable information corresponding to pen movement on the wall and further comprising means for erasing information formed by the pen movement.

The pen may have a pointed tip, a heated tip, a light emitting tip, or a tip connected to a high voltage high impedance source.

At least one wall of the display may be deformable, thin, or flexible so that the liquid crystal layer may be changed from one state to another by localised application of pressure, heat, light, electrostatic change, or an electric field alone or in combination.

The erasing may be by deformation of the layer, e.g. flexing, heating and cooling, or by an electrical field.

The liquid crystal material may have a cholesteric or smectic phase at the temperature of writing i.e. ambient value which will vary with conditions of use e.g. in the range 0° C. to 40° C. or wider.

The invention will now be described by way of example only with reference to the accompanying drawings of which:

Figure 1:
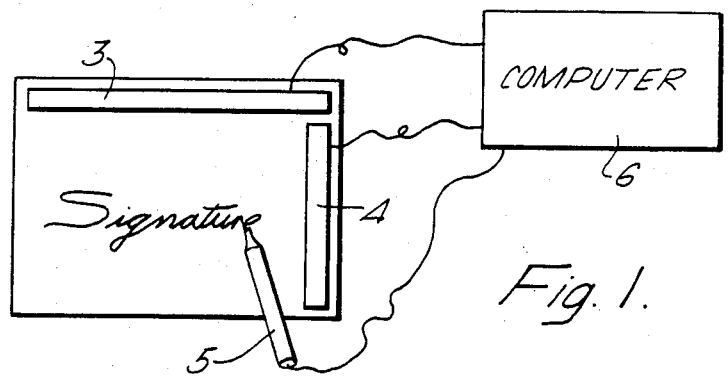
FIG. 1 is a plan view of liquid crystal display forming a writing pad together with a computer to provide a signature verification system.
Figures 2, 3, 4, 5:
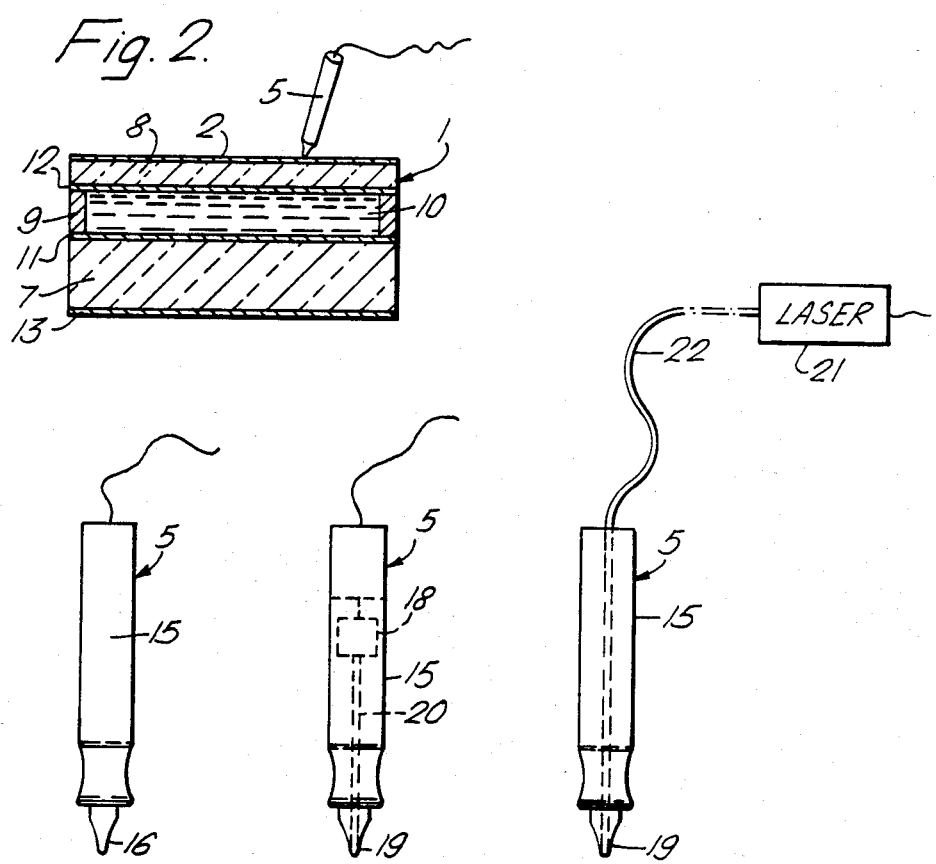
FIG. 2 is a cross section of the writing pad of FIG. 1.
FIGS. 3 to 5 are sections of various pens to be used with the writing pad in FIGS. 1, 2.

The signature verification system of FIGS. 1, 2 comprises a liquid crystal cell 1 having its upper surface covered with a thin resisitive layer 2, e.g. of tin oxide. Two low resistance x, y bus bars 3, 4 are mounted in good electrical contact with the resistive layer 2. A pen 5 and the x, y bars 3, 4 are separately connected to a computer 6. Each position of contact of the pen 5 with the resistive layer 2 gives a unique resistance value measured by the x y bars 3, 4 in combination. Thus the path of the pen 5 e.g. when forming a signature gives rise to electrical signals characteristic of a person's signature. Furthermore the path of the pen 5 on the liquid crystal cell 1 forms a visible display as the state of the liquid crystal layer is locally changed by the pen as described below. This provides a visible signature confirming the electrical signature.

The liquid crystal cell 1, FIG. 2, comprises a rear glass wall 7 and a thin front wall 8 spaced about 12–30 μm apart by spacers 9 and containing a layer 10 of liquid crystal material. Thin electrodes 11, 12 may cover the inner faces of the walls 7, 8. The material and thickness of the front wall 8 depends on the type of pen 5 to be used and may also depend on the erasing method to be used. The back 13 of the rear wall 7 or the rear electrode 11 may be coloured black or any other designed colour. FIGS. 3 to 5 show various pens.

As seen in FIG. 3 a pen 5 comprises a holder 15 carrying an electrically heated tip 16, somewhat similar to a quick heat soldering iron. Instead of being heated the tip 16 may be connected to a high voltage (e.g. about 100 volts) high impedance source. Alternatively the tip 16 may be unheated, supplied with no electrical voltage, but simply pointed.

Examples of cells and associated pens follow:

EXAMPLE 1

The cell 1 has a 30 μm thick layer of a cholesteric liquid crystal mixture.

Depending on the cholesteric pitch the liquid crystal 10 may appear transparent reflecting the colour of the rear 13 of the cell in the grandjean or planar state. Alternatively, where the cholesteric pitch is comparable with a visible light wavelength, the material gives strong reflection at that wavelength. In the focal conic state the liquid crystal scatters all wavelengths and appears translucent or opaque.

The cholesteric material may be:

| | wt. % |
|---|---|
|  CH₃CH₂CHCH₂—⟨⟩—⟨⟩—CN (with CH₃ branch) | 37 |
| C₅H₁₁—⟨⟩—⟨⟩—⟨⟩—CN | 10 |
| C₅H₁₁—⟨⟩—⟨⟩—CN | 22 |
| C₇H₁₅—⟨⟩—⟨⟩—CN | 21 |
| C₃H₇O—⟨⟩—⟨⟩—CN | 10 |

The cholesteric to isotropic point is 37° C. and reflects light of 610 nm (red/orange) at λ 20° C. Alternatively the cholesteric pitch may be chosen so that the material gives a transparent appearance in its grandjean state and reflects light off the rear of the cell, e.g. of a black colour.

A material giving iridescence of a particular colour is a mixture of materials A and B where A is:

| | Percentage by weight in A |
|---|---|
| CB15 = (+)—CH₃CH₂CHCH₂—⟨⟩—⟨⟩—CN | 50 |
| (±)CB15 = (±)—CH₃CH₂CHCH₂—⟨⟩—⟨⟩—CN | 27 |
| K15 = n-C₅H₁₁—⟨⟩—⟨⟩—CN | 23 |

(+) indicates an optionally active compound having a positive optical rotation angle and (±) indicates a recemic compound B is:

| | Percentage by weight in B |
|---|---|
| CB15 | 46 |
| E43 | 45 |
| n-C₅H₁₁—⟨H⟩—⟨⟩—⟨⟩—CN | 9 |

The material E43 is a commercially available mixture supplied by BDH Chemicals Ltd., Broom Road, Poole, Dorset.

Materials A, B and mixtures thereof give blue selective reflection in the grandjean state. The variation of clearing point is linear with varying proportion of A and B. At 100%A the clearing point is −11.3° C. and at 100%B the clearing point is 45° C. with a linear change for intermediate mixtures.

The colour of light selectively reflected can be varied by changing the amount of (±)CB15.

The cell front wall 8 is of 1 mm thick glass material, a finer line may be drawn with thinner glass.

To erase information the liquid crystal material 10 is caused to adopt the grandjean state. This is achieved by a physical deformation of the cell 1, e.g. by cell bending or overall flexing the top wall 8 by digital pressure. Alternatively the liquid crystal 10 may be heated above its clearing point and allowed to cool slowly to just below this point followed by faster cooling to ambient temperature. Rapid cooling from above the clearing point results in a focal conic state. The heating may be achieved by the electrodes 11, 12 on the cell walls 7, 8. Another way of erasing is to apply, via the electrodes 11, 12, an A.C. voltage across the liquid crystal material.

The time required for the material 10 to relax naturally from the focal conic to the grandjean state is partly dependent on the walls 7, 8 surface treatment. Usually the focal conic state exists only momentarily on cooling, and special cell treatment is necessary to prolong the focal conic state. For example both the walls 7, 8 may be coated with a polymer such as polyvinyl alcohol and one of the walls rubbed unidirectionally with a soft tissue prior to assembly. Such a treatment retards the relaxation to the grandjean state.

In operation the cell 1 is erased as above. The pen 5 used has a tip 16 heated to about 50° C. Writing on the top surface of the cell 1 locally raised the liquid crystal material 10 above its clearing point followed by rapid cooling (through convection). This results in a person's signature displayed as a line where the liquid crystal material 10 is in the focal conic state on a background of material in the grandjean state.

EXAMPLE 2

The cell 1 is similar to that of Example 1 but the front wall 8 is flexible and may be of conducting Mylar (Trade Mark) material about 150–200 μm thick.

The pen 5 is unheated and has a pointed and rounded tip.

In operation the cell 1 is heated above the clearing point and cooled quickly enough to cause the whole liquid crystal layer 10 to adopt the focal conic state. As before this heating can be achieved with the electrodes 11, 12 or an external heater. Writing on the cell 1 with the pen 5 causes local pressure on the liquid crystal material 10 which causes a local change to the grandjean state. A signature is thus observed by a line of material in the grandjean state on a background of material in the focal conic state.

EXAMPLE 3

The cell 1 has a flexible front wall 8, as in Example 2. Cholesteric material 10 whose dielectric anisotropy changes from positive to negative above a crossover frequency fo can be caused to adopt the grandjean state on application of a suitable high frequency (>fo) A.C. signal e.g. 50 kHz and adopt the focal conic state on application of a suitable low frequency (<fo) signal e.g. 1 kHz.

In operation the layer 10 is set into the grandjean state by application of a high frequency signal to the electrodes; this erases all previous information. A low frequency signal is applied to the electrodes 11, 12 at a value not quite sufficient to cause a change to the focal conic state. This low frequency signal is maintained whilst an unheated pen 5 is applied to write on the front wall 8. Local deformation causes a local increase in electric field causing a local change to the focal conic state. The signature is observed as a line of material in the focal conic state on a background in the grandjean state and will remain visible for some time after removal of the low frequency signal. A suitable two frequency switched material is the composition described in UK Pat. No. 2,085,910 example 5 wherein chiral alkyl end groups are substituted for the normal alkyl end groups in the trinuclear diester components.

EXAMPLE 4

The cell 1 has glass walls 7, 8 carrying electrodes 11, 12. Also one interior surface carries a coating (not shown) of a photoconductive material, e.g. amorphous silicon, or cadmium sulphide (CdS), etc., of high resistance in the dark and low resistance in light of a chosen (laser) wavelength.

The pens 5, FIG. 4 or 5, carries an optical fibre 20 or 22 from its tip 19 to a laser source 18 or 21.

In operation the cell 1 is erased by a high frequency voltage signal and then a low frequency voltage signal applied at a level not sufficient to change grandjean state into the focal conic state. Writing with the pen 5 causes a local decrease in the photo conductor resistance and hence a local increase in electric field across the layer 10 and a local change to a focal conic state. The signature is thus observed as a line of focal conic state material on a grandjean state background as in Example 3.

EXAMPLE 5

The cell 1 has a thin glass front wall 8 and carries electrodes 11, 12 on front and rear walls 7, 8. A heated tip pen 5 is used for writing.

As described in Example 3 a cholesteric material can be switched between its two states grandjean and focal conic by signals of low and high frequency. The threshold voltage at which a change in state occurs is temperature dependent. Thus application of below threshold voltage plus heated pen 5 can change the state of the liquid crystal material.

In operation the cell 1 is erased to the focal conic state by application of a low frequency signal. A below threshold voltage signal is applied to the electrodes 11, 12. The heated tip 8 pen 5 is applied to the cell 1 where a local increase in temperature causes a local lowering of the critical (at the applied voltage level) temperature needed to change the material to its grandjean state.

The following examples use a smectic liquid crystal material instead of the cholesteric material of examples 1 to 5. A smectic liquid crystal material changes in texture and appearance when heated above its clearing point and quenched. The effects may be more noticeable if the liquid crystal has a nematic phase over a limited temperature range just below the clearing point. In addition the texture i.e. a clear or scattering appearance, can be changed by application of a moderate frequency A.C. field. The field required decreases as the temperature approaches the clearing point.

EXAMPLE 6

A smectic liquid crystal material 10 replaces the cholesteric 10 of Example 1. Apparatus and operation remain as for example 5.

The smectic may be S1 or S2 commercial mixtures available from BDH Chemicals Ltd., Poole, England. Characteristics of these smectic materials are as follows:

|    | melting point | Smectic-Nematic | Nematic-Isotropic |
|----|---------------|-----------------|-------------------|
| S1 | 5° C.         | 40° C.          | 43° C.            |
| S2 | −10° C.       | 48° C.          | 49° C.            |

EXAMPLE 7

In the example 3 the cholesteric material is replaced by a smectic material.

EXAMPLE 8

In the example 4 the cholesteric material is replaced by a smectic material.

EXAMPLE 9

In the example 5 the cholesteric material is replaced by a smectic material.

EXAMPLE 10

The cell 1 incorporates a smectic liquid crystal material 10 and carries electrodes 11, 12. A laser wavelength absorber is incorporated into the electrodes 11, 12 or as a dye in the liquid crystal layer 10. The pen 5, FIGS. 4, 5 uses a laser 18, 21 of suitable wavelength to cause absorption and hence local heating in the layer 10. Operation of the display is otherwise similar to examples 1, 4, or 8.

EXAMPLE 11

The cell 1 has a cholesteric or a smectic liquid crystal layer 10 with glass walls 7, 8. The rear wall 7 carries an electrode layer 11 whilst the front wall 8 inner surface carries no electrode structure. A pen 5 has its tip 16 connected to a high voltage high impedance source (not shown).

In operation movement of the pen 5 across the front wall 8 causes a local field, above a threshold level, in the layer and an observable change in state as in examples 3, 7.

An alternative method to that of FIGS. 1, 2 for determining electrically the position of a pen 5 on the resistive layer 2 is to sequentially apply a voltage gradient, vertically and horizontally, to the layer 2. For this two parallel X bars and two parallel Y bars are arranged at the edges of the layer 2 and supplied with voltages by the computer 6. The pen 5 senses the vertical and horizontal voltages in sequence as the computer rapidly switches the voltages. Each position of the pen 5 on the layer 2 has a unique set of two voltage levels. Collectively these sets provide an electrical signature.

What we claim is:

1. A liquid crystal display comprising a layer of liquid crystal material contained between a front and a rear wall, a pen having a tip for contacting the front wall and changing the observed state of the layer at positions traced by the pen tip when moved across the front wall, means for erasing information formed by the pen movement, an optically transparent electrically resistive layer on the outer surface of the front wall for direct contact by the pen, and read out means for determining the instantaneous position of the pen on the display, wherein a visible image is formed on the display by virtue of the changed observed state of the liquid crystal material layer while an electrical representation of pen movement is obtained by virtue of the resistive layer in contact with the pen.

2. The display according to claim 1 wherein said tip is pointed for applying a high local pressure on the front wall.

3. The display according to claim 2 wherein the front wall is deformable under the pressure of the pen tip.

4. The display according to claim 1 wherein the pen includes means for heating the tip.

5. The display according to claim 4 wherein the front wall is thin so that heat is readily transmitted from the pen tip to the liquid crystal material adjacent the tip.

6. The display according to claim 1 wherein the pen includes a light source means for emitting light through the pen tip.

7. The display according to claim 6 wherein a layer of photoconductive material is formed on an inner face of at least one of said front and rear walls.

8. The display according to claim 1 wherein the pen tip is connected to a voltage source having a high electrical impedance.

9. The display according to claim 1 wherein said erasing means includes electrodes disposed on the inner faces of the front and the rear wall.

10. The display according to claim 1 wherein the means for erasing information comprises means for flexing the layer.

11. The display according to claim 1 wherein the means for erasing information comprises means for heating the layer.

12. The display according to claim 1 wherein the means for erasing information comprises means for applying an electric field across the layer.

13. The display according to claim 1 wherein at least one of said first and rear walls is surface treated to prolong the focal conic state of liquid crystal material in the layer.

14. The display according to claim 1 wherein the liquid crystal material is cholesteric.

15. The display according to claim 1 wherein the liquid crystal material is smectic.

16. The display according to claim 1 wherein the read out means includes read out electrode bus bars whereby the instantaneous position of the pen tip on the resistive layer may be determined.

17. A display as in claim 1 further comprising an electrode layer on the inner surface of the front wall.

18. A display as in claim 1 wherein said resistive layer comprises tin oxide.

19. A liquid crystal display comprising:
a layer of liquid crystal material having a normal observed state disposed between front and rear walls, at least one of said first and rear walls being flexible;
a resistive layer formed on an outer surface of said front wall;
pen means having a tip adapted to being manually brought into bearing contact with said resistive layer, said pen means enabling a user to manually scribe a path on said resistive layer to thereby responsively cause the normal observed state of said liquid crystal material layer to change along said path to thereby provide a visually perceptible representation of said path; and
means operatively coupled to said resistive layer for (a) generating electrical signals indicative of an instantaneous position of said pen in contact with said resistive layer to thereby establish an electrical representation of said path and (b) comparing said electrical representation to a stored representation to provide a verification of said scribed path.

20. An apparatus for producing indicia of human handwriting, comprising:
a liquid crystal cell, said cell including a first wall, a second wall, and a liquid crystal material disposed between said first and second walls, said material alternately having a first state and a second state optically different from said first state;
pen means, manipulatable by a user, for manually scribing a path on an outer surface of said first wall of said cell, said pen means including means for locally changing the state of said liquid crystal material along said path from said first state to said second state; and
reading means, disposed on said surface of said first wall, for producing indicia of the instantaneous position of said pen means as said pen means scribes said path.

21. An apparatus as in claim 20 wherein:
said pen means further includes an electrically conductive tip; and
said reading means includes
an optically-transparent electrically resistive layer disposed on said outer surface of said first wall, said conductive tip contacting said layer as said pen means scribes said path, and
means, coupled to said pen means and said layer, for producing signals characteristic of the instantaneous position of said pen means as said pen means scribes said path.

22. An apparatus as in claim 21 wherein said layer comprises an optically-transparent material.

23. An apparatus as in claim 20 further comprising erasing means for selectively changing the state of said liquid crystal material from said second state to said first state.

24. An apparatus as in claim 23 wherein said erasing means comprises:
a first electrode disposed on an inner surface of said first wall;
a second electrode disposed on an inner surface of said second wall; and
means for selectively producing an electrical potential between said first and second electrodes.

25. An apparatus as in claim 20 wherein:
said first wall is physically deformable; and
said state-changing means comprises means for physically deforming said first wall as said pen means scribes said path.

26. An apparatus for recognizing handwriting comprising:
- a liquid crystal cell, said cell including a first wall, a second wall, and a liquid crystal material disposed between said first and second walls, said material alternately having a first state and a second state optically different from said first state;
- pen means, manipulatable by a user, for manually scribing a path on an outer surface of said first wall of said cell, said pen means including means for locally changing the state of said liquid crystal material along said path from said first state to said second state;
- reading means, disposed on an outer surface of said first wall, for producing indicia of the instantaneous position of said pen means as said pen means scribes said path;
- storing means for storing indicia of at least one handwriting sample; and
- comparing means for comparing said stored indicia with said indicia of said path.

27. An apparatus as in claim 26, wherein:
said pen means include an electrically conductive tip; and
said reading means includes
- an optically-transparent electrically resistive layer disposed on said outer surface of said first wall, said conductive tip contacting said layer as said pen means scribes said path, and
- means, coupled to said pen means and to said layer, for producing signals characteristic of the instantaneous position of said pen means as said pen means scribes said path.

28. An apparatus as in claim 27 wherein said layer comprises an optically-transparent material.

29. An apparatus as in claim 26, further comprising erasing means selectively changing the state of said liquid crystal material from said second state to said first state.

30. An apparatus as in claim 29, wherein said erasing means comprises:
- a first electrode disposed on an inner surface of said first wall;
- a second electrode disposed on an inner surface of said second wall; and
- means for selectively applying an electrical potential between said first and second electrodes.

31. An apparatus as in claim 26, wherein:
said first wall is physically deformable; and
said state-changing means includes means for physically deforming said first wall as said pen means scribes said path.

* * * * *